United States Patent
Pradeep et al.

(10) Patent No.: US 10,146,631 B1
(45) Date of Patent: Dec. 4, 2018

(54) INCREMENTAL FOREVER BACKUPS FOR EXCHANGE

(71) Applicant: EMC IP Holding Company LLC, Hopkinton, MA (US)

(72) Inventors: Anappa Pradeep, Bangalore (IN); Sunil Yadav, Bangalore (IN); Suman Tokuri, Bangalore (IN); Vladimir Mandic, San Jose, CA (US); Matthew D Buchman, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 503 days.

(21) Appl. No.: 14/870,717

(22) Filed: Sep. 30, 2015

(51) Int. Cl.
*G06F 17/30* (2006.01)
*G06F 11/14* (2006.01)

(52) U.S. Cl.
CPC ...... *G06F 11/1451* (2013.01); *G06F 11/1464* (2013.01); *G06F 17/30371* (2013.01); *G06F 17/30575* (2013.01); *G06F 17/30876* (2013.01); *G06F 2201/84* (2013.01)

(58) Field of Classification Search
CPC ............ G06F 11/1453; G06F 11/1456; G06F 11/1451; G06F 3/0482
USPC .................................. 707/645, 646
See application file for complete search history.

(56) References Cited

U.S. PATENT DOCUMENTS

| | | | |
|---|---|---|---|
| 7,549,028 B2* | 6/2009 | Thompson | G06F 11/1451 711/162 |
| 7,707,184 B1* | 4/2010 | Zhang | G06F 11/1435 707/645 |
| 8,635,187 B2* | 1/2014 | Beatty | G06F 11/1451 707/646 |
| 8,645,496 B2* | 2/2014 | Uhlmann | G06F 11/1451 709/219 |
| 8,706,992 B2* | 4/2014 | Liu | G06F 3/0482 711/162 |
| 9,384,256 B2* | 7/2016 | Banerjee | G06F 17/30592 |
| 9,703,640 B2* | 7/2017 | Beatty | G06F 11/1451 |
| 2006/0053333 A1* | 3/2006 | Uhlmann | G06F 11/1451 714/2 |
| 2010/0077160 A1* | 3/2010 | Liu | G06F 3/0482 711/162 |
| 2012/0179655 A1* | 7/2012 | Beatty | G06F 11/1451 707/646 |
| 2013/0339302 A1* | 12/2013 | Zhang | G06F 17/30581 707/649 |
| 2013/0339303 A1* | 12/2013 | Potter | G06F 17/30581 707/649 |
| 2015/0142745 A1* | 5/2015 | Tekade | G06F 11/1451 707/646 |
| 2016/0077928 A1* | 3/2016 | Dwivedi | G06F 11/1441 714/19 |
| 2016/0210203 A1* | 7/2016 | Kumarasamy | G06F 17/30575 |
| 2016/0314046 A1* | 10/2016 | Kumarasamy | G06F 11/1435 |
| 2017/0024232 A1* | 1/2017 | Barve | G06F 9/45558 |

* cited by examiner

*Primary Examiner* — Jean M Corrielus
(74) *Attorney, Agent, or Firm* — Staniford Tomita LLP (57) ABSTRACT

An incremental backup of a database includes issuing a request to a copy service requesting a snapshot of a volume having the database, and identifying a writer of the database that should participate in creating the snapshot. From the snapshot, changes to the database since a last backup of the database and log files associated with the database that include data not yet committed to the database, are transmitted to a backup storage unit.

20 Claims, 9 Drawing Sheets

INCREMENTAL FOREVER BACKUPS FOR EXCHANGE

TECHNICAL FIELD

Embodiments are generally directed to networked-based data backup methods, and more specifically to backing up and restoring a database.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's digital society organizations depend on having ready access to their data. Data, however, can be lost in a variety of ways such as through accidental deletion, data corruption, disasters and catastrophes (e.g., fires or flooding), media failures (e.g., disk crash), computer viruses, and so forth. Thus, it is important to backup data in the event that the data needs to be restored. An organization may have an immense amount of data that is critical to the organization's operation. Backing up data and subsequently recovering backed up data, however, can involve large amounts of computing resources such as network bandwidth, processing cycles, and storage due to the complexity and amount of data to be backed up and restored when needed.

For example, a database, such as a Microsoft Exchange database, can be several hundred gigabytes or many terabytes in size. Backing up such a large file can take a very long time. As a result, in some organizations will implement protection strategies involving a mix of full and partial backups. The database itself may be backed up weekly, such as on a Sunday or other day with low demand, while the associated database transaction logs are backed up daily. This process can help to speed the backup process because data in the database itself is not backed up as part of the daily backups. The restore procedures for such a protection strategy, however, is a multi-stage restore involving restoring a full backup followed by a number of partial backups. As such, restores can be very slow and complex.

Therefore, there is a need for data protection techniques that address both backup performance and recovery performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for backing up and restoring data that can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
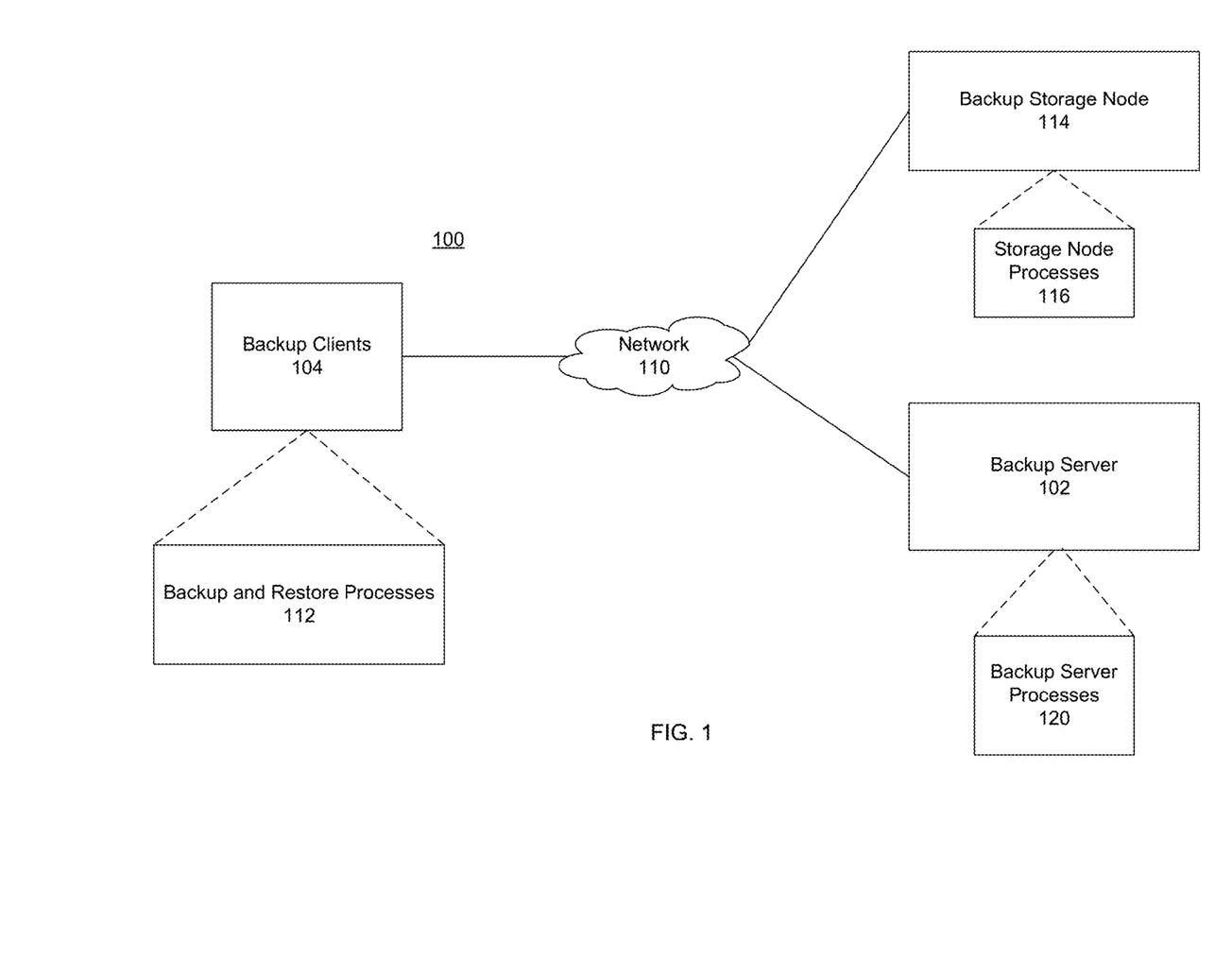
FIG. 1 is a diagram of a large-scale network implementing a data backup and recovery process that provides for backing up and recovering a database, under some embodiments.

FIG. 1 illustrates a computer network system 100 that implements one or more embodiments of a system for backing up and restoring data. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media of a backup storage node 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup storage node 114. A backup client executes processes 112 for backing up data to the storage node, restoring the backed up data, and coordinating with backup server processes 120 on the backup server and processes 116 on the storage node. The backup server processes include processes to index the backups and identify which savesets reside on which backup devices or volumes. The backup storage node executes processes 116 for receiving backup information from the backup client, writing data to the backup devices or volumes, sending tracking information to the backup server to track the data written to the devices or volumes, and reading the data from the devices or volumes at the request of the client during a recovery.

In an embodiment, system 100 may represent a Data Domain Restorer (DDR)-based deduplication storage system, and a storage server or node having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
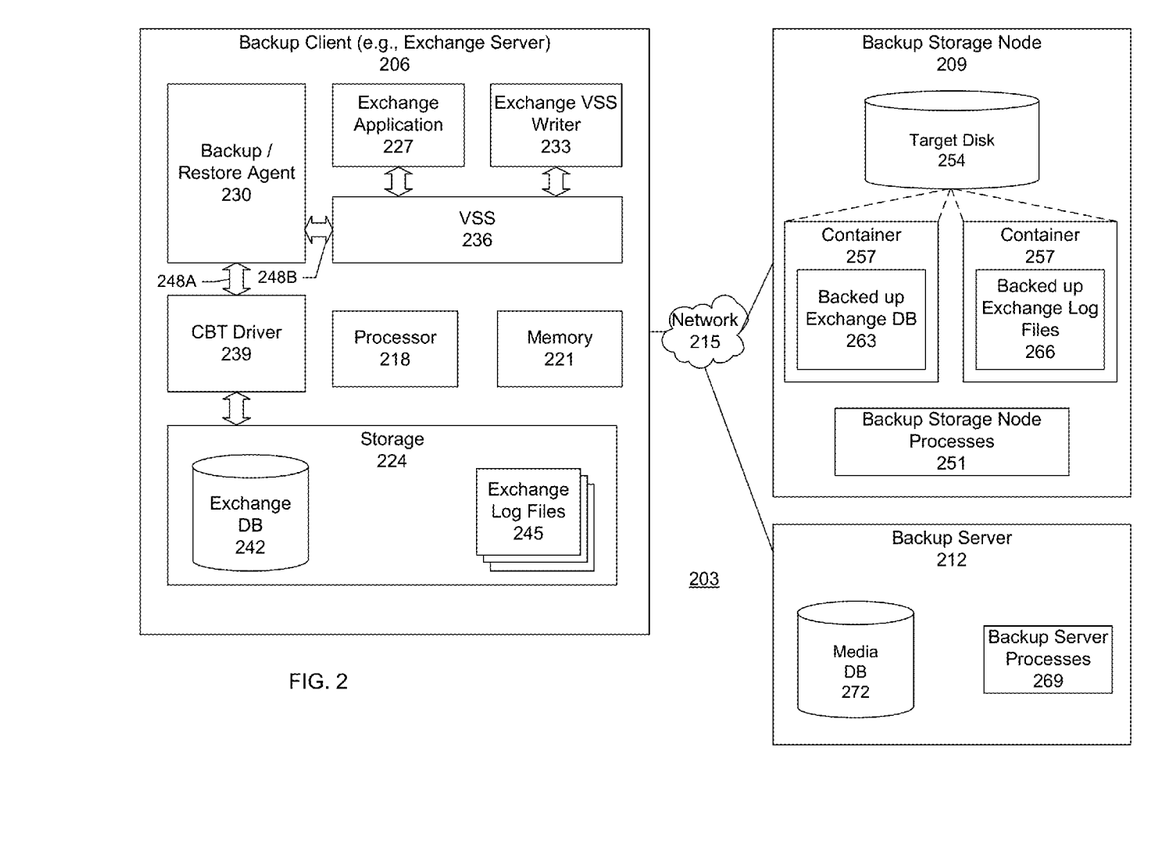
FIG. 2 shows an overall architecture of a system for backup and recovery of a database according to a specific embodiment.

FIG. 2 shows further detail of a system 203 for backing up and restoring data. This system includes a backup client 206, a backup storage node 209, and a backup server 212, each of which are interconnected by a network 215. The backup client includes data that is to be backed up to the backup storage node. The backup server is responsible for indexing the data backed up to the backup storage node.

In a specific embodiment, the backup client includes an Exchange or Microsoft Exchange server. In this specific embodiment, system 203 provides for the backup (and recovery) of a Microsoft Exchange database including log files that are associated with the database. Exchange is a Microsoft messaging system that includes a mail server, an e-mail program (e-mail client), and groupware applications. Exchange is a widely used Microsoft application in the market. Exchange databases grow rapidly. In many cases, the time given for a backup window is insufficient to backup an Exchange database because of the size of the database. Thus, traditionally Exchange databases (e.g., files having an *.edb extension) are backed up once and then the Exchange logs (but not the database itself) are subsequently backed up as incremental backups. Nevertheless, there are many problems with this process. In particular, restores can be very slow. As a result, the restoration of an Exchange database often fails to meet restore time objectives (RTO).

More specifically, an Exchange backup traditionally needs to be performed through a file-based backup process (.edb/logs files) by scanning/reading the entire file system or Exchange writer for the backup list. However, the performance of a file-scanning backup can be a major bottleneck in the protection of a high-density Exchange Database and logs, due to the amount of time required for a file system\Exchange writer walk. The amount of data to be read for each incremental is a major problem of previous solutions. During a recover operation a user would need to recover a full backup and apply all the corresponding incremental backups. As a result, recovery can be very time consuming and there are often performance issues.

In this specific embodiment, however, a process of the system shown in FIG. 2 provides for Exchange block-based backups (BBB) and recovery. This process allows using the block-based backup process to perform a backup of an Exchange database (e.g., an *.edb file) and logs at the file block level. Using this new process, users can take advantage of "forever" incremental backups for Exchange using a block-based process. In other words, after an initial or full backup of the Exchange database, which may be referred to as a level zero backup, each following backup may be an incremental backup in which the data is read from the volume block-by-block. This simplifies the restore and these subsequent backups can be performed very fast because they are incremental backups rather than full backups.

Block-based backup is a technology which allows the backup application to walk the volume(s)/disk(s) where the Exchange database and transaction logs reside and backup all the blocks used by the database and logs. In a specific embodiment, the backup agent coordinates with a changed block tracking (CBT) driver, service, or framework. In this specific embodiment, a block-based backup by the backup agent uses the CBT driver to backup only blocks that have changed. A changed block may include modifications to existing data (e.g., modifications to data previously backed up) or newly added data (e.g., data that has not been previously backed up).

In a specific embodiment, an initial or first backup of the Exchange database and logs residing on the volume uses a block-based process involving associated file blocks (e.g., .edb file extents or blocks on the volume). Subsequent backups backup only changed blocks on the volume for the database file (e.g., *.edb) and uncommitted logs associated with the database. In other words, a current incremental backup may include both portions of the database that have changed since a last backup (e.g., modified existing data or newly added data) and uncommitted logs as of the time of the current backup. Committed log files can be excluded from the current backup because the backup agent will be backing up the actual database (or portions of the actual database) itself. That is, the current backup will include the data stored (and thus committed) to the database that was not present in a previous backup.

In a specific embodiment, if the backup target includes Data Domain, full backups are synthesized from these backups. If, however, the backup target does not support artificially synthesizing a full backup, e.g., backup target is an Advanced File Type Device (AFTD), an incremental backup is chained to a previous full or incremental backup. In a specific embodiment, which may be referred to as "incremental forever," incremental backups are sparse. A backup may include only the blocks that are in use by the file system for Exchange. That is, only the Exchange database and logs file blocks may be backed up. A database recover operation can include recovering from backups taken in a "forever" incremental configuration as if recovering from a full backup (e.g., single step recovery).

Referring now to FIG. 2, the backup client, backup storage node, and backup server may be as shown in FIG. 1 and described in the discussion accompanying FIG. 1. For example, the backup client can be a general purpose computer with software and hardware. The hardware may include a processor 218, memory 221, storage 224 (e.g., hard disk), input/output (I/O) controller, network interface, and other computing components, each of which may be interconnected by a bus architecture or any interconnection scheme.

The software may include an operating system, application programs, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API).

In a specific embodiment, the backup client includes a Microsoft Exchange application 227, a backup/restore agent 230, an Exchange writer 233, a copy service 236, and a change block tracking (CBT) driver 239.

As discussed above, Microsoft Exchange is a messaging platform that provides email, scheduling, and tools for collaboration and messaging service applications. In this specific embodiment, the backup client may be referred to as an Exchange server. The Exchange server provides various messaging services (e.g., email) to support clients connected to the server. Microsoft Exchange stores data in an Exchange database file 242 (e.g., files having the ".edb" file extension) and one or more log files 245.

Data, such as an email received at the Exchange server, may first be written from memory to a log file. Exchange may pre-allocate or pre-determine a size for the log files (e.g., 1 megabyte (MB)). When a size of a current log file reaches the pre-determined size, Exchange may create a new log file. The log files are then committed to the database. That is, the data stored in the log files are written to or incorporated into the database. The writing of data in a log file to the database may occur during an idle machine cycle such as during off-peak times so that computing resources of the server can be devoted to other tasks during peak times. Thus, at any given time there can be multiple, e.g., two or more, log files. For example, there can be 2, 5, 10, 20, 30, 40, 50, or more than 50 log files. The log files may include committed log files (e.g., log files having data already written to the database), uncommitted log files (e.g., log files having data not yet written to the database), or both.

In a specific embodiment, copy service 236 is referred to as a volume shadow copy service (VSS) as provided by Microsoft. VSS is an operating system (e.g., Microsoft Windows) resident service that allows the system to make snapshots of a volume even when the volume is in use. It is used in conjunction with a file system (e.g., NTFS) that is able to create and store shadow copies of volumes. A snapshot is a read-only copy of a volume at a particular point in time. A snapshot may be referred to as a volume snapshot. Snapshots allow for the creation of consistent backups of a volume and ensure that contents do not change and are not locked while the backup is in progress. Snapshots are typically the first step in any incremental or full backup session, and the VSS service initiates and manages the snapshot creation process.

A snapshot of a volume includes an area of space on a disk that may be referred to as "shadow storage." After the snapshot is created a change to any data block from that time forward cannot get written until a copy of that block's data before the change (as it was when the snapshot was created) is written to the differencing area in shadow storage. In this way the data on the disk at the time the snapshot was created is preserved, block by block, in the shadow storage area. The snapshot data is then available either from the original disk, if the data blocks requested have not changed, or from the differencing area if they have.

VSS uses a collection of VSS writers to facilitate the backup of various VSS-compatible applications. Each VSS-compatible application may have a corresponding writer. For example, the Exchange VSS writer corresponds to the Exchange application. A writer is responsible for functions such as quiescing the corresponding application and data stores to be backed up (e.g., temporarily freezing application I/O write requests).

When a backup is initiated by the backup agent, VSS informs the appropriate VSS writers of the backup. This allows the application corresponding to the VSS writer to flush memory-resident data to disk for the backup. The backup agent or application reads a snapshot created by VSS in response to a backup request to VSS. Specifically, VSS performs a copy-on-write (COW) operation on the volume and allows a backup application to read and backup the snapshot data.

The CBT driver is responsible for tracking changes to one or more particular files as of a last backup of the files. The CBT driver can track changes at the file or file block-level. Tracking changes at the file or file block-level provides a more granular process than tracking changes at the volume-level. Specifically, tracking changes at the file-level allows for an incremental backup of a particular file—and more specifically blocks of the file that have changed since a last backup—without having to backup other files on the volume, regardless of whether or not they have changed, and without having to backup other portions of the particular file that have not changed since the last backup.

The backup agent is installed at the backup client and is responsible for backing up (and restoring) the Exchange database and associated log files. The backup agent coordinates 248A, B with VSS and the CBT driver to backup the Exchange database and associated Exchange log files to the backup storage node. In a specific embodiment, the backed up log files include uncommitted Exchange log files. Committed log files are excluded or omitted from the backup since the backup includes the changed portions of the database itself. When the database is to be restored, the uncommitted log files can be replayed against the restored database to write the data stored in the uncommitted log files to the restored database.

The backup storage node includes backup storage processes 251, and a target disk 254. The target disk stores the backed up database and uncommitted log files. Backups may be organized into savesets. A saveset refers to a set of source data that is to be backed up. A saveset may include a single file or multiple files. In a specific embodiment, the database and uncommitted log files are stored in separate containers. That is, the target disk includes a first container 257 and a second container 260. A backed up database 263 is stored in the first container. Backed up uncommitted log files 266 are stored in the second container. The second container is separate or different from the first container.

In a specific embodiment, the containers are virtual hard disk files. Thus, the backed up database may be stored in a first virtual hard disk file. The uncommitted log files associated with the database may be stored in a second virtual hard disk file, separate or different from the first virtual hard disk file. For example, a name of the first virtual hard disk file may be different from a name of the second virtual hard disk file. The first and second virtual hard disk files may be stored in different locations or folders on the backup storage node. The virtual hard disks may be files formatted in the VHD or VHDx file format as provided by Microsoft. The VHD or VHDx format is a container format, which can contain disk related information including a file system. VHD or VHDx files can be mounted and used as a regular disk. Volumes such as NTFS/ReFS/FAT32 or any file system which the OS supports on the mounted disk can also be created.

Storing the database and uncommitted log files in separate containers or separate virtual hard disks helps to facilitate managing the backup and restore processes. Storing the database and uncommitted log files in separate containers reflects the differences in the data that is being backed up. Specifically, for each given backup, the uncommitted log files will be different. The containers or virtual hard disks storing the database backup, however, may include a parent or base virtual hard disk and one or more related child virtual hard disks. The parent virtual hard disk may represent a full backup of the database. The child virtual hard disks may represent incremental backups for changes to the database and may point back to the parent virtual hard disk for unchanged data.

Storing the database separate from the log files can facilitate generating a synthetic full backup of the database. In other words, in some cases, a synthetic full backup of the database is created on the backend (e.g., backup storage node) by merging the parent virtual hard disk and one or more child virtual hard disks. Synthesizing full backups from incremental backups helps to increase recovery time objectives (RTO). For example, over time there may be an increasing number of incremental backups stored on the backup media. These incremental backups are dependent on previous backups and cannot be recovered separately or without the previous backup copy. The number of incremental backups is inversely proportional to recovery performance. Thus, as the number of incremental backups increases the restore performance decreases. Further, managing many separate incremental backups in the media (e.g., managing retention periods and expiration times and dates) can be very cumbersome.

The backup server includes backup server processes 269 and a media database 272. The media database provides a catalog or index that stores metadata associated with the database backups stored on the backup storage node. The metadata may include, for example, a time and date of the backup, device in which the backup or saveset is stored (e.g., location of the backup media or volume), an identification of the backup client (e.g., Exchange server name), and so forth.

Figure 3:
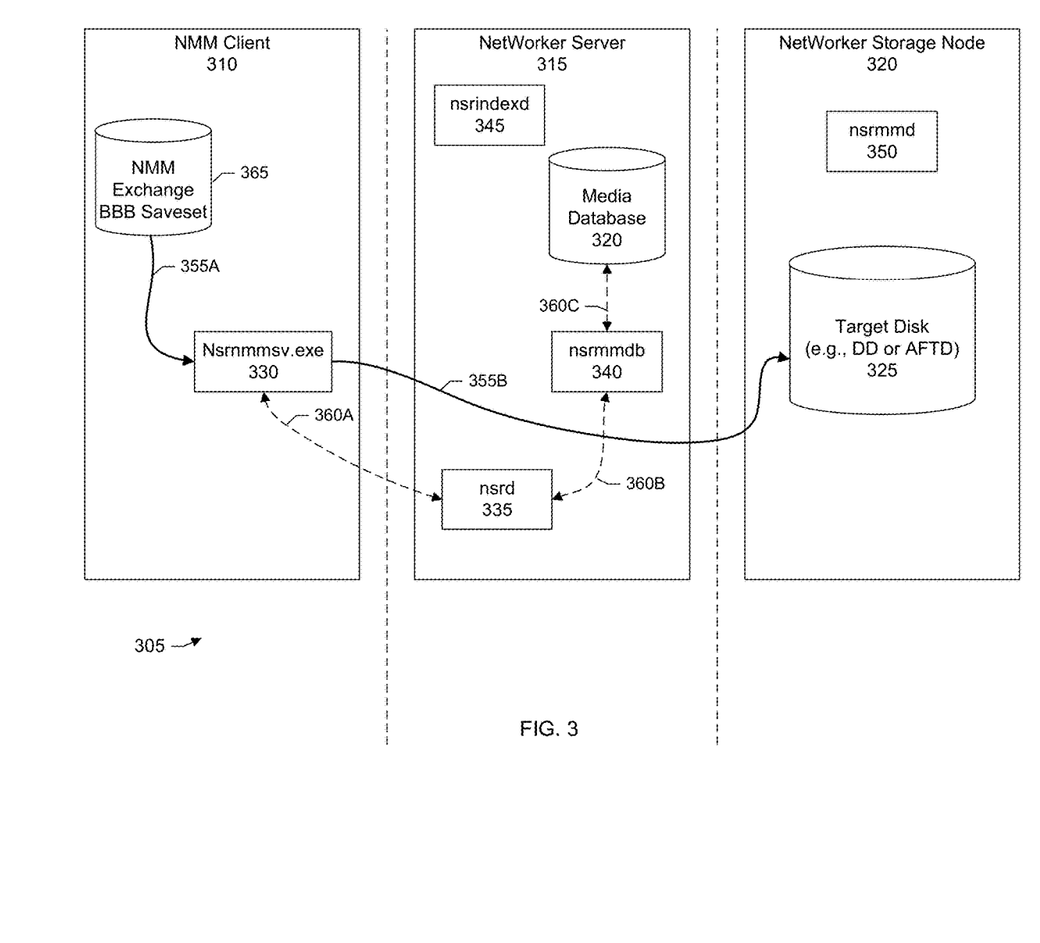
FIG. 3 shows a block diagram of a functional workflow for backing up a database according to a specific embodiment.

FIG. 3 shows a sequence diagram 305 for an overall workflow of the backup system according to a specific embodiment. In this specific embodiment, the backup system is implemented in a product referred to as NetWorker from EMC Corporation. The NetWorker system includes a NetWorker Client Module for Microsoft Applications (NMM) client 310, a NetWorker server 315 including a media database 320, and a NetWorker storage node 320 including a target disk 325. This diagram shows the functional operations of an Exchange block-based backup.

The NMM client includes a process "nsrnmmsv.exe" 330. The NetWorker server includes processes "nsrd" 335, "nsrmmdb" 340, and "nsrindexd" 345. The NetWorker storage node includes a process "nsrmmd" 350. Bolded lines 355A and 355B indicate a data flow. Broken lines 360A, 360B, and 360C indicate inter-process communication.

A snapshot 365 corresponds to a shadow copy volume created by the VSS framework. The NMM client process 330 is responsible for reading the Exchange file data blocks from the shadow copy volume and sending them to the target disk. A direct file access (DFA) mechanism may be used to directly write data to the target disk.

Process 335 ("nsrd") is the main NetWorker server daemon. In order to catalog the backup in the media database for those Exchange files, process 330 sends requests to process 335 to create records in the media database. Process 340 manages the media database to track which backup saveset resides on which backup volume. More particularly, process 345 is responsible for insertion and deletion of backup saveset records into the indexes. Process 350 is the storage node daemon. This process is responsible for save and recovery operations. In particular, the daemon receives backup information from the NMM client, writes data to the devices (volumes), sends tracking information to the NetWorker server to track the data written to the devices (volumes), and reads the data from the devices (volumes) at the request of the client during a recovery.

Figure 4:
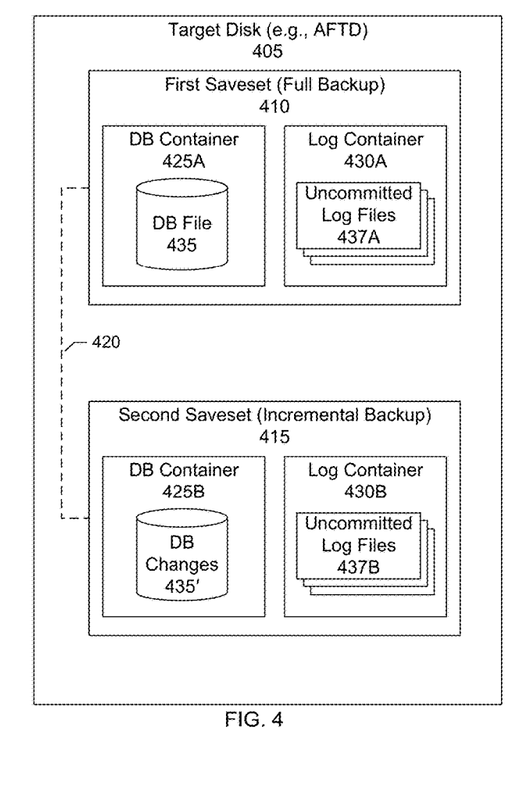
FIG. 4 shows a block diagram of an incremental backup saveset being chained to a full backup saveset according to a specific embodiment.

There can be different types of target disk storing the backup data. FIG. 4 shows a simplified block diagram of a first type of target disk 405. This type target disk may be referred to as an Advanced File Type Device (AFTD). In a specific embodiment, if the backup target is an AFTD, an incremental backup is chained to a previous full or incremental backup. More particularly, in the example shown in FIG. 4, target disk 405 includes a first saveset 410 and a second saveset 415. The second saveset is linked 420 to the first save set. The first saveset corresponds to a backup at a first time. The second saveset corresponds to a backup at a second time, after the first time. For example, the first saveset may include a full backup of Exchange. The second saveset may include an incremental backup of Exchange that stores changes made after the full backup (e.g., after the first time).

Specifically, the first saveset may include a first database container 425A and a first uncommitted log files container 430A. First database container 425A stores a full backup of an Exchange database 435 as of the first time. The first database container may be formatted as a virtual hard disk file and may be referred to as a parent or base virtual hard disk. First uncommitted log files container 430A stores one or more uncommitted log files 437A associated with the Exchange database. Uncommitted log files 437A store data not yet committed to the database as of the first time or as of the current backup.

The second saveset may include a second database container 425B and a second uncommitted log files container 430B. Second database container 425B stores an incremental backup of the Exchange database. The second database container may be formatted as another virtual hard disk file and may be referred to as a differencing virtual hard disk. The incremental backup of the Exchange database is identified as 435' in FIG. 4 and includes changes to the database after the last backup. For example, the data may include changes to the database between the last and current backup (or changes between the first and second time). Data that has not changed (e.g., data already present in a previous backup) may be excluded from the incremental backup. Second uncommitted log files container 430B stores one or more uncommitted log files 437B associated with the Exchange database. Uncommitted log files 437B store data not yet committed to the database as of the second time or as of the current backup.

In this specific embodiment, the incremental backup is chained to the previous backup (e.g., previous full or incremental backup). The backup system associates the child container with the parent through incremental chaining. The incremental backups may be maintained as separate backups without being merged to create a synthetic full backup. More particularly, a virtual hard disk file corresponding to the full backup of Exchange database 435 and a virtual hard disk differencing file corresponding to the incremental backup of Exchange database 435' may not be merged.

Figure 5:
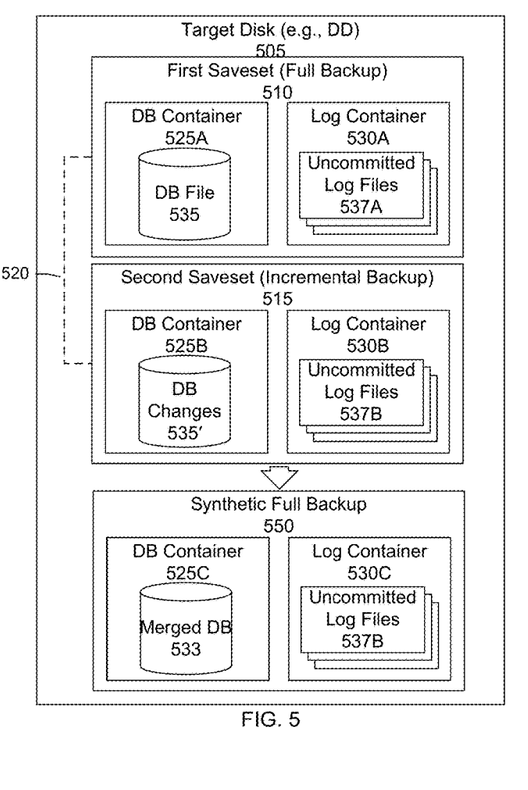
FIG. 5 shows a block diagram of a synthetic full backup based on a full backup saveset and one or more incremental backup savesets according to a specific embodiment.

FIG. 5 shows a simplified block diagram of a second type of target disk 505, different from the first type of target disk. This type of target disk may be referred to as a Data Domain disk which supports synthetic full backups. FIG. 5 is similar to FIG. 4. For example, target disk 505 includes a first saveset 510 and a second saveset 515. The second saveset is linked 520 to the first saveset. The first saveset corresponds to a backup at a first time. The second saveset corresponds to a backup at a second time, after the first time. For example, the first saveset may include a full backup of Exchange. The second saveset may include an incremental backup of Exchange that stores changes made after the full backup or after the last backup.

More particularly, the first saveset may include a first database container 525A and a first uncommitted log files container 530A. First database container 525A stores a full backup of an Exchange database 535 as of the first time. First database container 525A may be formatted a virtual hard disk file and may be referred to as a parent or base virtual hard disk. First uncommitted log files container 530A stores one or more uncommitted log files 537A associated with the Exchange database. Uncommitted log files 537A store data not yet committed to the database as of the first time or as of the current backup.

The second saveset may include a second database container 525B and a second uncommitted log files container 530B. Second database container 525B stores an incremental backup of the Exchange database. Second database container 525B may be formatted as another virtual hard disk file and may be referred to as a differencing virtual hard disk. The incremental backup of the Exchange database is identified as 535' in FIG. 4 and includes changes to the database between the first and second time (e.g., changes between the last and current backup). Second uncommitted log files container 530B stores one or more uncommitted log files 537B associated with the Exchange database. Uncommitted log files 537B store data not yet committed to the database as of the second time or as of the current backup.

In the example of FIG. 5, however, a synthetic full backup 550 has been artificially created on the target disk based on the full and incremental backups. The synthetic full backup includes a third database container 525C and a third uncommitted log files container 530C. The third database container stores a merging 533 of the full backup of Exchange database 535 and the incremental backup of Exchange database 535'. More particularly, in a specific embodiment, the third database container is formatted as a virtual hard disk and corresponds to a merging of the parent virtual hard disk from the full backup of the database and the differencing virtual hard disk from the incremental backup of the database.

Copies of the parent and differencing virtual hard disks may be merged in order to maintain the full and incremental backups as separate backups. This allows recoveries to particular points in time. For example, the target disk may include a full backup of the database and two or more incremental backups of the database such as first, second, and third incremental backup, each incremental backup corresponding to a particular point in time. A synthetic full backup may be created based on the full backup, the first incremental backup, and the second incremental backup. The third incremental backup may be excluded from the synthetic full backup in order to recover the database as of the second incremental backup. Another synthetic full backup may be created based on the full backup, the first incremental backup, the second incremental backup, and the third incremental backup in order to recover the database as of the third incremental backup, and so forth.

The uncommitted log files of the synthetic full backup may correspond to or be copies of the uncommitted log files from the last incremental backup upon which the synthetic full backup is based. When the database is recovered based on the synthetic full backup, the log files from the last incremental backup can be replayed against the recovered database so that the data stored in the log files can be written to the recovered database.

Figure 6:
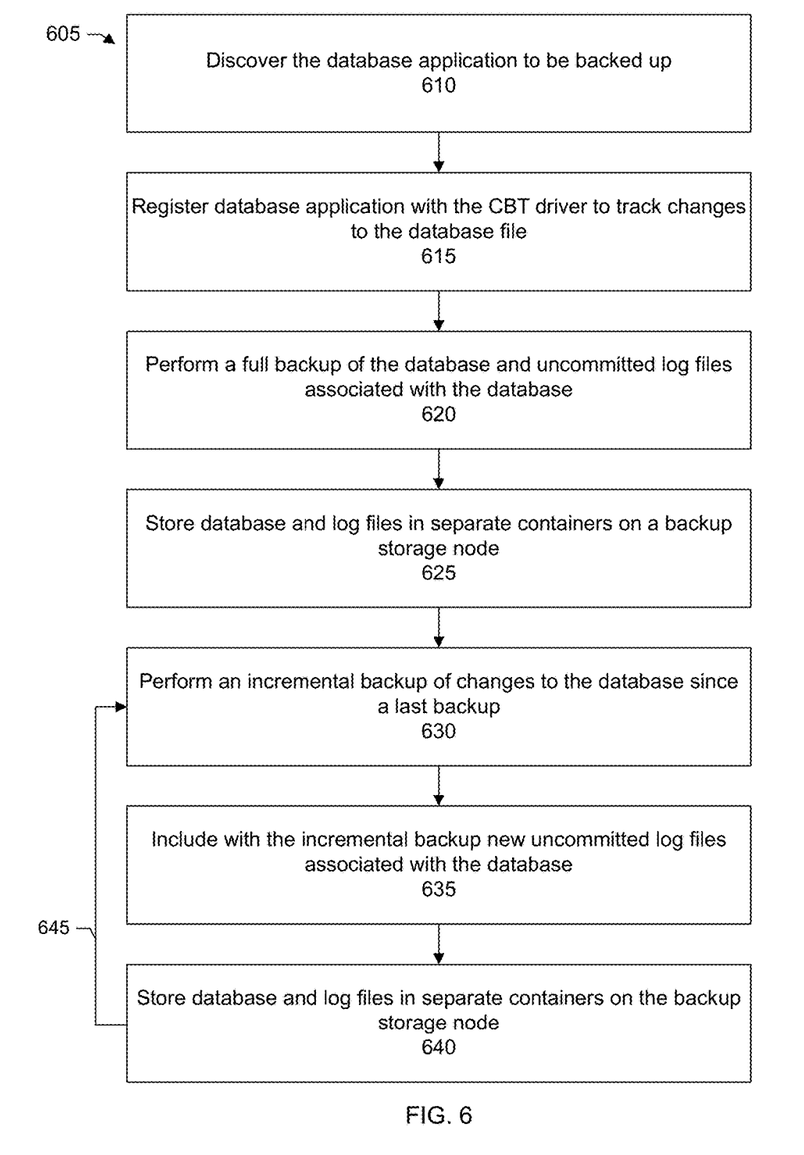
FIG. 6 shows a flow of a full backup followed by an incremental backup according to a specific embodiment.

FIG. 6 shows an overall flow 605 of the backup system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, the backup/restore agent initiates a discovery process to detect and identify the database. The discovery may include obtaining a location and name of the database such as the folder path on the backup client where the database file is stored. In a specific embodiment, the discovery process includes communicating with a Microsoft PowerShell Exchange Management Interface. The Exchange Management Shell provides an interface that the backup agent can use to discover the database, storage location, files associated with the database, the file layout, and other attributes and properties associated with the database.

In a step 615, the backup agent registers the discovered database with the changed block tracking (CBT) driver to track changes to the database file. In other words, the backup agent provides to the CBT driver an identification of the database files that the backup agent wishes to track changes to. This may include, for example, providing to the CBT driver the name of the database file and the location of the database file.

In a step 620, the backup agent performs a full backup of the database and uncommitted log files associated with the database as of the time of the backup. In a step 625, the database and log files are stored in separate containers on a backup storage node.

Figure 7:
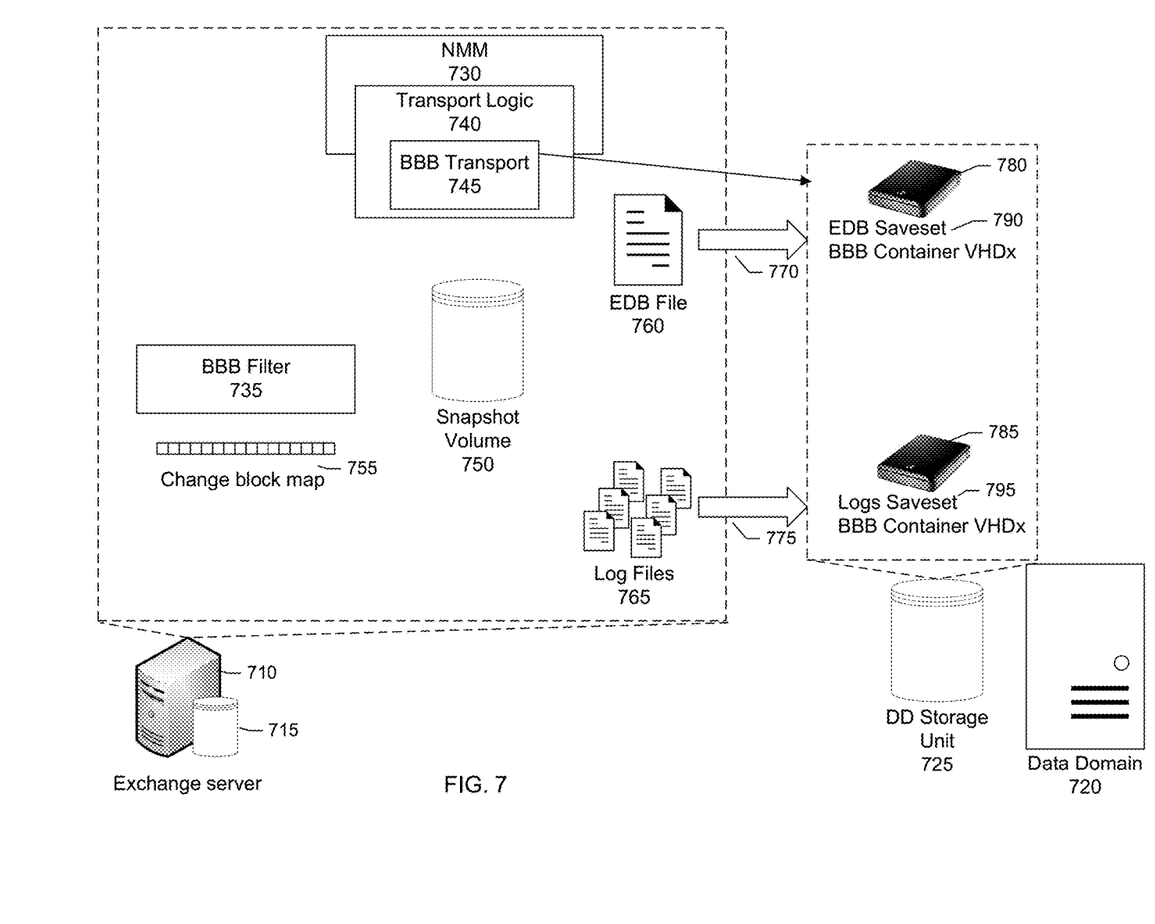
FIG. 7 shows a block diagram of a full backup according to a specific embodiment.

FIG. 7 shows a block diagram of a full backup of a database according to a specific embodiment. In this specific embodiment, the database includes an Exchange database, the backup client is an Exchange Server, the changed block tracking driver is referred to as a block-based backup (BBB) filter driver, the backup agent is referred to as the EMC NetWorker Module for Microsoft (NMM), and the backup storage node includes the EMC Data Domain system and Data Domain Storage Unit.

As shown in the example of FIG. 7, there is an Exchange server 710 having an Exchange database 715. There is a Data Domain storage node 720 having a Data Domain storage unit 725. A backup agent (e.g., NMM) 730 and changed or block-based backup (BBB) filter driver 735 is installed at the Exchange server. NMM includes transport logic 740. The transport logic includes a BBB transport module 745.

When a backup of the Exchange database is to be performed, NMM coordinates with the copy service (e.g., VSS) on the Exchange server to obtain a snapshot 750 of the volume storing the Exchange database. Upon completion of the snapshot, the BBB filter driver starts writing tracking in order to capture subsequent changes to the database for a next backup of the database. In particular, the BBB filter driver maintains a change block map 755 that tracks changes to a file block associated with the particular file that was registered by the backup agent for change tracking.

The backup agent (NMM), or more particularly the BBB transport module, is responsible for reading from the snapshot volume an Exchange database file 760 and associated uncommitted log files 765, and transmitting 770, 775 the database and log files to the backup storage node. The BBB transport module is further responsible for creating on the backup storage node a first container (e.g., first virtual hard disk or first VHDx) 780 and a second container (e.g., second virtual hard disk or second VHDx) 785, and partitioning and formatting the volumes. The BBT transport module copies complete contents of Exchange EDB file 760 from snapshot 750 to first container or VHDx 780.

Similarly, the BBB transport module copies complete contents of uncommitted log files 765 from snapshot 750 to second container or VHDx 785, which is separate from first container or VHDx 780. As discussed above, the backups may be organized into savesets. For example, as shown in FIG. 7, there can be a database or EDB saveset 790 within the first container for the database. There can be a logs saveset 795 within the second container for the uncommitted log files associated with the database.

Referring back to FIG. 6, after the full backup is performed, in a step 630, the backup agent performs an incremental backup of changes to the database since a last backup. The last backup may be a full backup or a previous incremental backup. The incremental backup will include data of the database that has not been previously backed up. The data may include modifications to existing data in the database after the last backup, newly added data to the database after the last the backup, or both.

In a step 635, the backup agent includes with the incremental backup of the database, new uncommitted log files associated with the database as of this current backup. In other words, the incremental backup includes both the changes to the database since the last backup and the new uncommitted log files. In a step 640, the changes to the database and the new uncommitted log files are stored in separate containers on the backup storage node. The incremental backup process shown in steps 630-640 can then be repeated 645 for a next or subsequent incremental backup.

Figure 8:
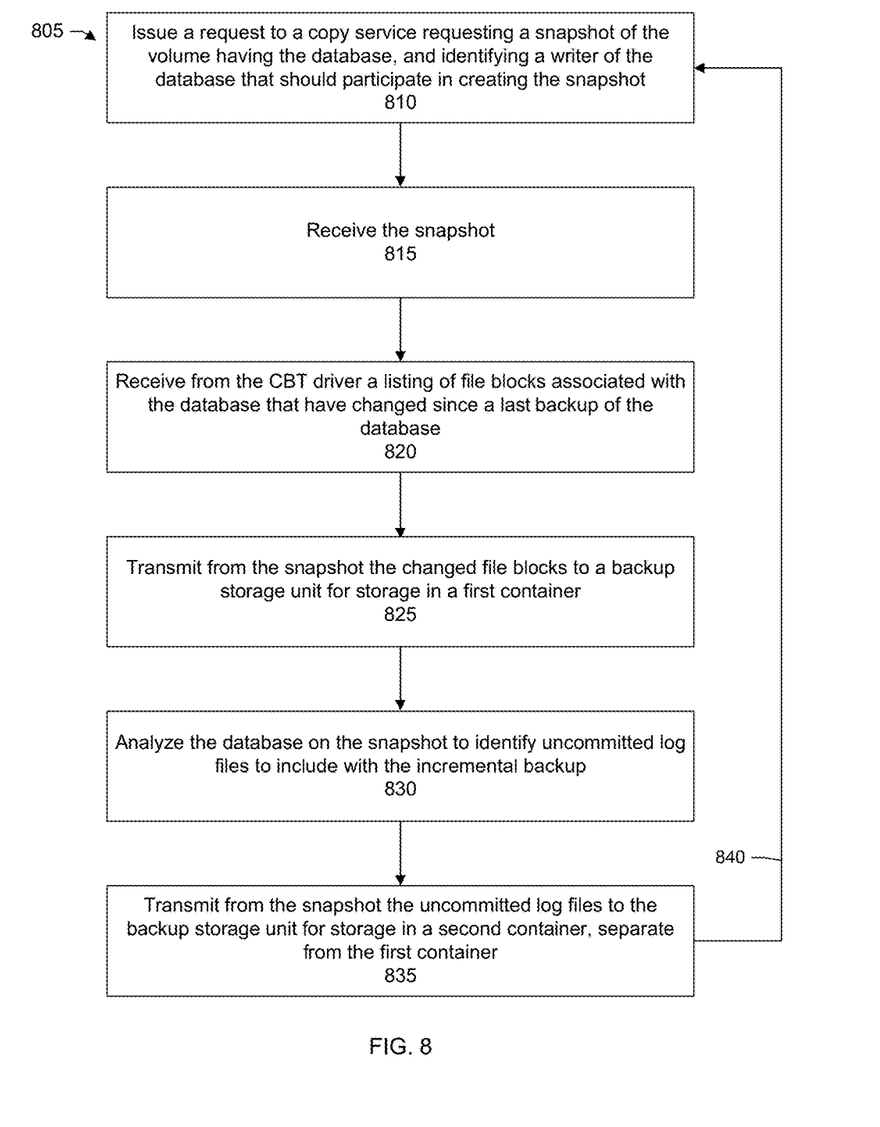
FIG. 8 shows a more detailed flow of an incremental backup according to a specific embodiment.

FIG. 8 shows a more detailed flow 805 of an incremental backup. In a step 810, the backup agent issues a request to a copy service requesting a snapshot of the volume storing the database and identifying a writer of the database that should participate in creating the snapshot. In a specific embodiment, the database writer includes the Exchange VSS writer. Identifying the database writer allows the copy service (e.g., VSS) to coordinate with the corresponding application and writer to prepare for the backup. In this specific embodiment, the Exchange VSS writer prepares the Exchange database for a backup by, for example, flushing memory-resident data and freezing or stopping writes to the database and logs on disk.

In a step 815, the backup agent receives the volume snapshot or, more specifically, receives an indication that the volume snapshot has been created. Even though Exchange may be the only application being backed up by the backup agent, VSS creates a snapshot of the entire volume or disk where any Exchange data such as Exchange database files and log files are stored. As a result, portions of the snapshot may include data that should not be backed up by the backup agent. It is desirable to identify what particular data from the snapshot should be backed up. For example, data from the snapshot to not backup may include non-Exchange data, Exchange data that has previously been backed up (e.g., unchanged Exchange data), or both.

Thus, in a step 820, the backup agent receives from the CBT driver a listing of file blocks that should be backed up based on the files (e.g., Exchange database file) the backup agent had previously registered to be tracked. In a specific embodiment, the listing of file blocks includes Exchange database file blocks that have changed since a last backup of the database. In this specific embodiment, a block is the unit of data (R\W). Generally, that may be referred to as "cluster size" and "cluster" in file system terminology. The list of changed blocks includes the addresses of these clusters or cluster numbers. The listing from the CBT driver may specify the changed file blocks by, for example, a starting offset and length.

In a step 825, the backup agent accesses or reads from the snapshot the changed file blocks specified in the listing from the CBT driver. The backup agent transmits from the snapshot the changed file blocks of the database to a backup storage unit for storage in a first container.

In a step 830, the backup agent analyzes the database on the snapshot to identify or determine the uncommitted log files associated with the database that should be included with the incremental backup. For example, certain database applications, such as Exchange track which logs have or have not been committed to the database. This information may be stored in a header of the database or other file. The backup agent reviews this information to identify the log files that should be included with the backup. In a specific embodiment, the backup agent, issues a query to an Exchange Management tool to request a dump of a header of the database. The backup agent reviews the header information to determine the log range corresponding to the uncommitted log files. As discussed, these log files are required to recover the database as the log files store data that have yet to be committed to the database.

In a step 835, the backup agent searches the snapshot for the uncommitted log files associated with the database on the snapshot and transmits the uncommitted log files from the snapshot to the backup storage unit for storage in a second container, separate from the first container. As discussed, VSS creates a snapshot of the entire volume or disk. Distinguishing between log files that have and have not been committed allows the backup agent to reduce the number of log files to include with the incremental backup.

In particular, committed log files can be excluded, omitted, or not transmitted to the backup storage unit as part of the backup or incremental backup. The committed log files can be excluded from the incremental backup because the backup includes the database or, more particularly, the changed portions of the database. There is no need to maintain the full series of transaction logs since each incremental backup can include the actual changed data stored in the database.

Incremental backup processes 810-835 can be repeated 840 for a subsequent or next incremental backup. The CBT driver coordinates with the copy service (e.g., VSS) to begin tracking changes as soon as the snapshot is created. For example, once the copy service releases the IO stack after the creation of the snapshot, the CBT driver integrates with the copy service event instructing the filter driver that an IO thaw has occurred. Upon completion of the snapshot, the CBT driver can clear or reset its change block map or start a new map and begin write tracking for a subsequent or next incremental backup.

An incremental backup may occur on a daily basis or any other frequency as desired. Further, as discussed above, an incremental backup may be accompanied by the creation of a synthetic full backup on the backup storage node. In a specific embodiment, creating a synthetic full backup includes obtaining a previous copy of the database file, creating a new virtual copy of the database, and replacing file blocks in the new virtual copy with the corresponding changed file blocks from a current backup. The net effect is that each incremental backup may result in a "full backup" or synthesized full backup. The synthesized full backup includes a "full backup" of the database and a set of uncommitted log files as of the last incremental backup associated with the synthesized full backup. As a result, recovery time objectives are improved because a restore of the database will not require a multi-stage restore involving a sequence of incremental backups to apply.

Figure 9:
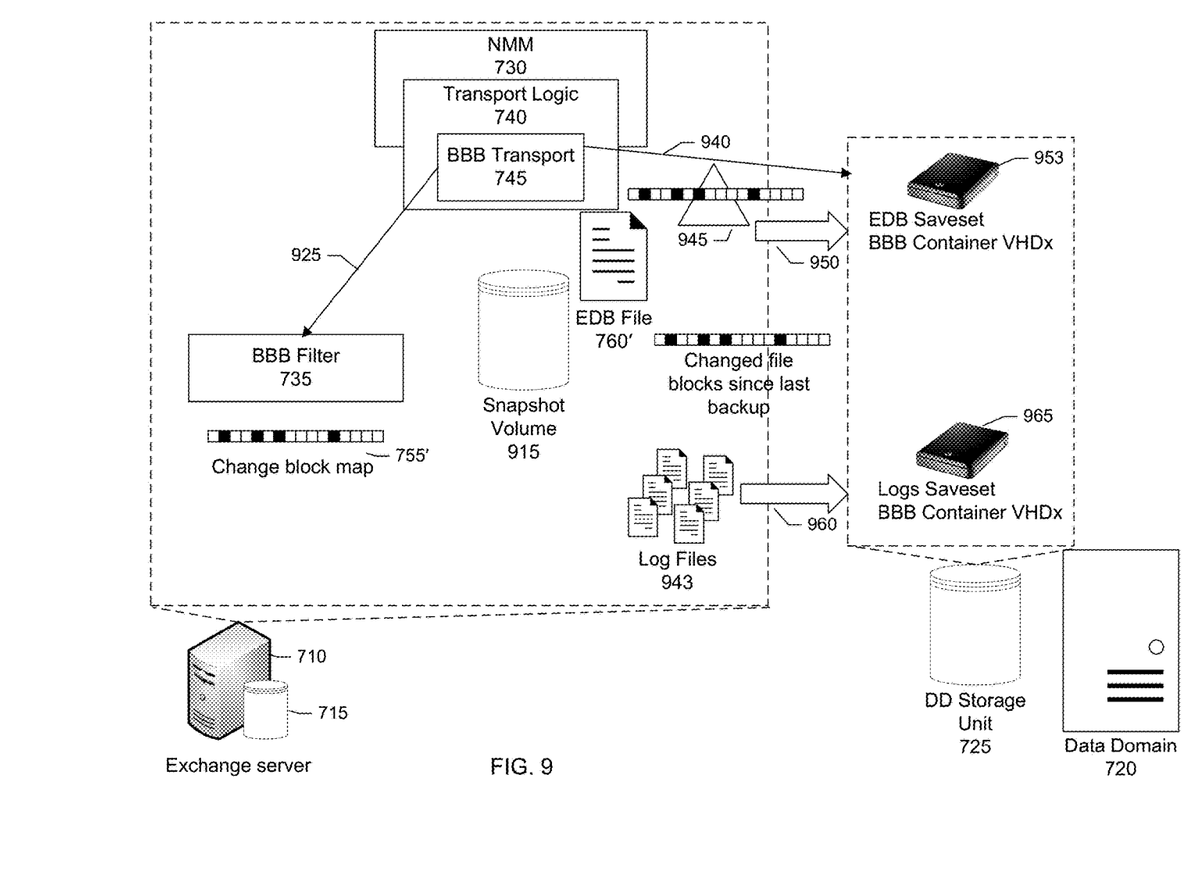
FIG. 9 shows a block diagram of an incremental backup according to a specific embodiment.

FIG. 9 shows a block diagram of an incremental backup of a database according to a specific embodiment. In this specific embodiment, the database includes an Exchange database. FIG. 9 is similar to FIG. 7. FIG. 7, however, shows a full backup and FIG. 9 shows the incremental backup that may follow the full backup shown in FIG. 7.

Referring now to FIG. 9, backup agent (e.g., NMM) 730 installed at Exchange server 710 obtains or receives a snapshot volume 915 of the Exchange server. The agent obtains or receives 925 a list of changed file blocks for an Exchange (e.g., *.edb) file 760' on the snapshot from changed block or block-based backup (BBB) filter driver 735. Exchange database file 760' (FIG. 9) corresponds to Exchange database file 760 (FIG. 7) and represents the changes made to the database after the backup shown in FIG. 7. As discussed, the filter driver maintains a change block map. The map tracks which blocks of a particular file registered with the filter driver that have changed since a last backup of the particular file. In FIG. 9, the changed blocks for the Exchange EDB file are shown as solid black-filled squares in a change block map 755'. Change block map 755' (FIG. 9) corresponds to change block map 755 (FIG. 7). The map shown in FIG. 9, however, has been updated to show the file blocks of the Exchange database file that have changed since the backup shown in FIG. 7.

The backup agent coordinates 940 with storage node 720 to backup changed file blocks 945 and a new set of uncommitted log files 943 to storage unit 725 of the storage node. In particular, changed file blocks 945 of the Exchange database file are transmitted 950 from the snapshot volume on the Exchange server to the storage unit. The changed file blocks may be organized into a saveset (identified in FIG. 9 as an "EDB saveset") are stored in a third container 953 created on the backup storage node or unit. In a specific embodiment, the third container is a virtual hard disk file or, more specifically, a differencing virtual hard disk file.

New set of uncommitted log files 943 are transmitted 960 from the snapshot volume on the Exchange server to the storage unit. The new set of uncommitted log files may be organized into another saveset (identified in FIG. 9 as "Logs saveset") are stored in a fourth container 965 created on the backup storage node or unit, separate from the third container. The fourth container stores a full backup of the new set of uncommitted log files. In a specific embodiment, the fourth container is a virtual hard disk file.

In other words, during an incremental backup of a database file, the storage node receives a set of changed file blocks, and set of uncommitted log files. The changed file blocks correspond to changes to the database file since a last backup of the database file. The set of uncommitted log files store data not yet committed to the database file as of the incremental backup.

As shown in the example of FIG. 5, a full backup of the database may be synthesized on the backup storage node. In a specific embodiment, the backup storage node uses a process referred to as Data Domain (DD) virtual synthetics to create a copy of the Exchange database (EDB) saveset from a previous backup. The process copies changed file blocks of the EDB file on the snapshot to replace the associated virtual hard disk file blocks in the virtual hard disk file of a new EDB saveset. The backup system, however, creates a new full (level 0) container for the logs saveset since the logs change with each backup.

Figure 10:
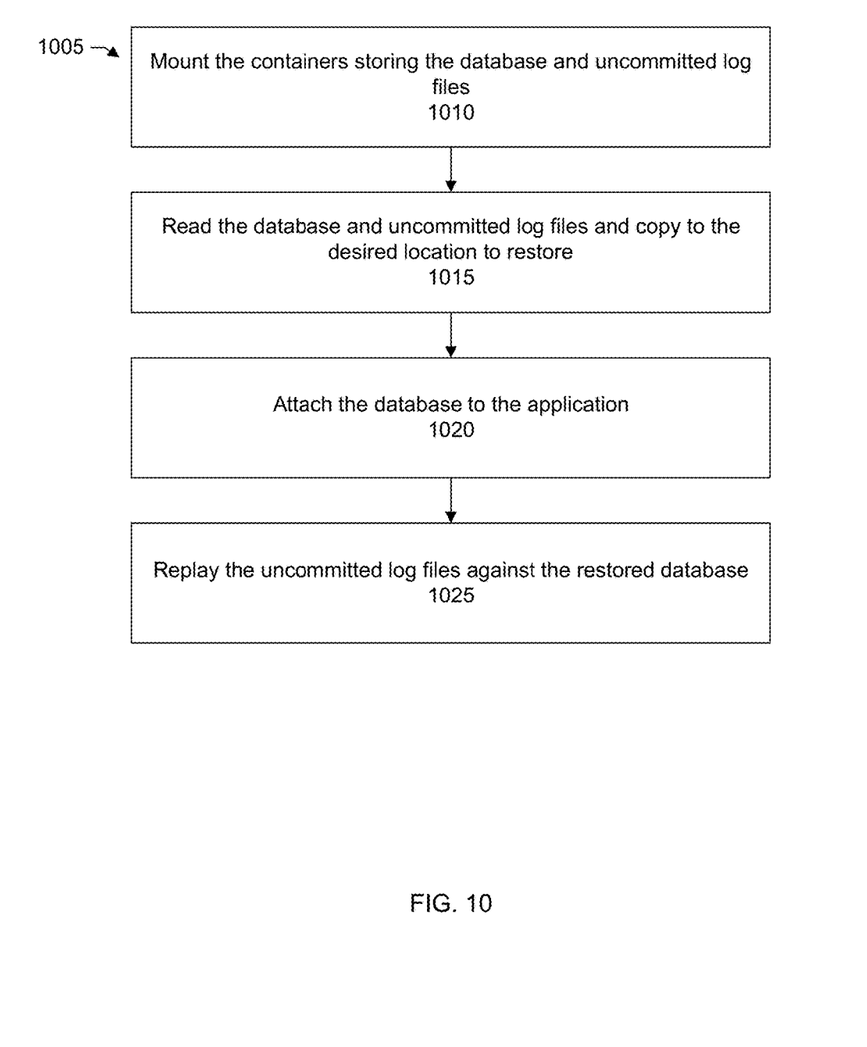
FIG. 10 shows a flow for recovering a database according to a specific embodiment.

FIG. 10 shows an overall flow 1005 for restoring a database. In a step 1010, the containers storing the database file and uncommitted log files associated with the database are mounted. In a step 1015, the backup agent reads the database file and log files from their respective containers and copies the files to a local or remote server where the Exchange server is running In a step 1020, the database is attached to the Exchange application. In a step 1025, the uncommitted log files are replayed against the restored database. In a specific embodiment, copying is not needed for a Granular Level Restore (GLR). A Granular Level Restore refers to restoring select user emails, folders, or both from the backup of an Exchange database. A user does not need to restore the entire Exchange database. Rather, the Exchange database backup can be mounted and there can be an application including other third party applications that can be used to browse and restore user mail boxes, emails, and so forth.

It should be appreciated that while some embodiments are shown and described in conjunction with backing up a Microsoft Exchange database and log files, aspects and principles of the system can be applicable to backing up other types of data including other types of databases.

In a specific embodiment, a backup method includes identifying a changed block tracking (CBT) driver that tracks the changes for files, initializing the CBT for the Exchange databases, taking a snapshot of an Exchange database, performing a first full backup of the Exchange database (e.g., *.edb and logs), selecting a backup format that supports the chaining, creating separate backup containers for the edb and log files, and saving the edb and log files in their respective containers. The selected backup format may be a VHDx formatted file.

In another specific embodiment, a backup method for a next or subsequent incremental backup includes taking a snapshot, retrieving the changed file block from the driver (CBT) for the edb file, reading the changed file blocks from the snapshot, creating a container to hold the data on the target, associating the child container with the parent through incremental chaining, populating the container to hold the changed file blocks, and saves the uncommitted logs in another container.

In a specific embodiment, a method for an incremental backup of a database stored on a volume of a backup client includes issuing a request to a copy service requesting a snapshot of the volume having the database, and identifying a writer of the database that should participate in creating the snapshot; receiving an indication from the copy service that the snapshot of the volume has been created on the backup client; identifying on the snapshot changed file blocks associated with the database, the changed file blocks including changes to the database since a last backup of the database; identifying on the snapshot log files associated with the database, the log files comprising data not yet committed to the database on the snapshot; and transmitting for the incremental backup of the database the changed file blocks and the log files to a backup storage unit.

The changes to the database may be stored in a first container on the backup storage unit, and the log files may be stored in a second container on the backup storage unit, separate from the first container. A first container on the backup storage unit may include a virtual hard disk file that stores a full backup of the database, a second container on the backup storage unit may include a virtual hard disk differencing file that stores the changes to the database. A synthetic full backup of the database is created on the backup storage unit based on the virtual hard disk file and the virtual hard disk differencing file. The virtual hard disk file and the virtual hard disk differencing file may be maintained on the backup storage unit as separate files.

The method may further include after the receiving an indication that the snapshot has been created, requesting a database management utility to identify from the database on the snapshot a log range corresponding to uncommitted log files; and receiving the log range in response to the request, where the uncommitted log files are the log files to be included with the incremental backup of the database.

The transmitting for the incremental backup may include excluding from the transmission other log files associated with the database, where the other log files include data committed to the database on the snapshot. The database may include a Microsoft Exchange Database.

In another specific embodiment, there is a system for an incremental backup of a database stored on a volume of a backup client, the system including a processor-based system executed on a computer system and configured to: issue a request to a copy service requesting a snapshot of the volume having the database, and identifying a writer of the database that should participate in creating the snapshot; receive an indication from the copy service that the snapshot of the volume has been created on the backup client; identify on the snapshot changed file blocks associated with the database, the changed file blocks including changes to the database since a last backup of the database; identify on the snapshot log files associated with the database, the log files comprising data not yet committed to the database on the snapshot; and transmit for the incremental backup of the database the changed file blocks and the log files to a backup storage unit.

In another specific embodiment, there is a computer program product, comprising a non-transitory computer-readable medium having a computer-readable program code embodied therein, the computer-readable program code adapted to be executed by one or more processors to implement a method including issuing a request to a copy service requesting a snapshot of the volume having the database, and identifying a writer of the database that should participate in creating the snapshot; receiving an indication from the copy service that the snapshot of the volume has been created on the backup client; identifying on the snapshot changed file blocks associated with the database, the changed file blocks including changes to the database since a last backup of the database; identifying on the snapshot log files associated with the database, the log files comprising data not yet committed to the database on the snapshot; and transmitting for the incremental backup of the database the changed file blocks and the log files to a backup storage unit.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for an incremental block-based backup of a database stored on a volume of a backup client comprising:
   registering the database with a driver to track changes to blocks on the volume that are associated with the database;
   issuing a request to a copy service requesting a snapshot of the volume having the database, and identifying a writer of the database that participates in creating the snapshot;
   receiving an indication from the copy service that the snapshot of the volume has been created on the backup client;
   receiving, from the driver, an identification of changed file blocks associated with the database, the changed file blocks comprising changes to the database since a last backup of the database;
   requesting a dump of a header of the database;
   reviewing the dump of the header to identify uncommitted log files associated with the database;
   based on the review and upon the snapshot having been created, identifying on the snapshot the uncommitted log files associated with the database, the uncommitted log files comprising data not yet committed to the database on the snapshot; and
   transmitting for the incremental block-based backup of the database the changed file blocks and the uncommitted log files to a backup storage unit, wherein the incremental block-based backup of the database is performed without backing up other file blocks of the database that have not changed since the last backup, without backing up other changed file blocks of the volume that are not associated with the database, and wherein the incremental block-based backup of the database allows the database to be backed up within an amount of time that is less than an amount of time required for a file-based backup of the database.

2. The method of claim 1 wherein the changes to the database are stored in a first container on the backup storage unit, and the uncommitted log files are stored in a second container on the backup storage unit, separate from the first container.

3. The method of claim 1 wherein a first container on the backup storage unit comprises a virtual hard disk file that stores a full backup of the database, a second container on the backup storage unit comprises a virtual hard disk differencing file that stores the changes to the database, and
   wherein a synthetic full backup of the database is created on the backup storage unit based on the virtual hard disk file and the virtual hard disk differencing file.

4. The method of claim 1 wherein a first container on the backup storage unit comprises a virtual hard disk file that stores a full backup of the database, a second container on the backup storage unit comprises a virtual hard disk differencing file that stores the changes to the database, and
   wherein the virtual hard disk file and the virtual hard disk differencing file are maintained on the backup storage unit as separate files.

5. The method of claim 1 wherein the transmitting for the incremental backup comprises:
   excluding from the transmission other log files associated with the database, wherein the other log files comprise data committed to the database on the snapshot.

6. The method of claim 1 wherein the database comprises a Microsoft Exchange Database.

7. The method of claim 1 wherein data in an uncommitted log file is committed to the database when a size of the uncommitted log file reaches a pre-determined size.

8. A system for an incremental block-based backup of a database stored on a volume of a backup client, the system comprising:
   a processor-based system executed on a computer system and configured to:
   issue a request to a copy service requesting a snapshot of the volume having the database, and identifying a writer of the database that participates in creating the snapshot;
   receive an indication from the copy service that the snapshot of the volume has been created on the backup client;
   identify on the snapshot changed file blocks associated with the database, the changed file blocks comprising changes to the database since a last backup of the database;
   upon the snapshot having been created, search the snapshot for uncommitted log files associated with the database, the uncommitted log files comprising data not yet committed to the database on the snapshot; and transmit for the incremental block-based backup of the database the changed file blocks and the uncommitted log files to a backup storage unit, wherein the incremental block-based backup of the database is performed without backing up other file blocks of the database that have not changed since the last backup, without backing up other changed file blocks of the volume that are not associated with the database, and wherein the incremental block-based backup of the database allows the database to be backed up within an amount of time that is less than an amount of time required for a file-based backup of the database.

9. The system of claim 8 wherein the changes to the database are stored in a first container on the backup storage unit, and the uncommitted log files are stored in a second container on the backup storage unit, separate from the first container.

10. The system of claim 8 wherein a first container on the backup storage unit comprises a virtual hard disk file that stores a full backup of the database, a second container on the backup storage unit comprises a virtual hard disk differencing file that stores the changes to the database, and
wherein a synthetic full backup of the database is created on the backup storage unit based on the virtual hard disk file and the virtual hard disk differencing file.

11. The system of claim 8 wherein a first container on the backup storage unit comprises a virtual hard disk file that stores a full backup of the database, a second container on the backup storage unit comprises a virtual hard disk differencing file that stores the changes to the database, and
wherein the virtual hard disk file and the virtual hard disk differencing file are maintained on the backup storage unit as separate files.

12. The system of claim 8 wherein the processor-based system is configured to:
exclude from the transmission other log files associated with the database, wherein the other log files comprise data committed to the database on the snapshot.

13. The system of claim 8 wherein the processor-based system executed on the computer system is configured to:
request a dump of a header of the database; and
review the dump of the header to identify the uncommitted log files of the database.

14. A computer program product, comprising a non-transitory computer-readable medium having a computer-readable program code embodied therein, the computer-readable program code adapted to be executed by one or more processors to implement a method for an incremental block-based backup of a database stored on a volume of a backup client, the method comprising:
issuing a request to a copy service requesting a snapshot of the volume having the database, and identifying a writer of the database that participates in creating the snapshot;
receiving an indication from the copy service that the snapshot of the volume has been created on the backup client;
identifying on the snapshot changed file blocks associated with the database, the changed file blocks comprising changes to the database since a last backup of the database;
requesting a dump of a header of the database;
reviewing the dump of the header to identify uncommitted log files associated with the database;
based on the review and upon the snapshot having been created, searching the snapshot for the uncommitted log files associated with the database, the uncommitted log files comprising data not yet committed to the database on the snapshot; and
transmitting for the incremental block-based backup of the database the changed file blocks and the uncommitted log files to a backup storage unit, wherein the incremental block-based backup of the database is performed without backing up other file blocks of the database that have not changed since the last backup, without backing up other changed file blocks of the volume that are not associated with the database, and wherein the incremental block-based backup of the database allows the database to be backed up within an amount of time that is less than an amount of time required for a file-based backup of the database.

15. The computer program product of claim 14 wherein the changes to the database are stored in a first container on the backup storage unit, and the uncommitted log files are stored in a second container on the backup storage unit, separate from the first container.

16. The computer program product of claim 14 wherein a first container on the backup storage unit comprises a virtual hard disk file that stores a full backup of the database, a second container on the backup storage unit comprises a virtual hard disk differencing file that stores the changes to the database, and
wherein a synthetic full backup of the database is created on the backup storage unit based on the virtual hard disk file and the virtual hard disk differencing file.

17. The computer program product of claim 14 wherein a first container on the backup storage unit comprises a virtual hard disk file that stores a full backup of the database, a second container on the backup storage unit comprises a virtual hard disk differencing file that stores the changes to the database, and
wherein the virtual hard disk file and the virtual hard disk differencing file are maintained on the backup storage unit as separate files.

18. The computer program product of claim 14 wherein the transmitting for the incremental backup comprises:
excluding from the transmission other log files associated with the database, wherein the other log files comprise data committed to the database on the snapshot.

19. The computer program product of claim 14 wherein the database comprises a Microsoft Exchange Database.

20. The computer program product of claim 14 wherein the method comprises:
registering the database with a driver to track changes to blocks on the volume that are associated with the database; and
receiving, from the driver, an identification of the changed file blocks.

* * * * *